Oct. 3, 1944.  A. L. WOODY  2,359,704
FORMING GUIDE FOR ENGRAVING MACHINES
Filed Aug. 20, 1941   2 Sheets-Sheet 1

Inventor
Albert L. Woody
By Kent W. Wonnell Atty.

Oct. 3, 1944. A. L. WOODY 2,359,704
FORMING GUIDE FOR ENGRAVING MACHINES
Filed Aug. 20, 1941 2 Sheets-Sheet 2
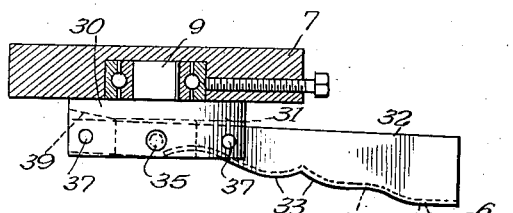
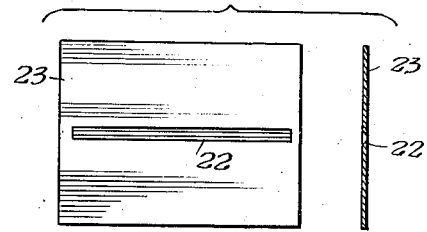
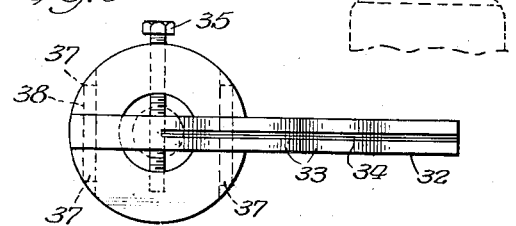
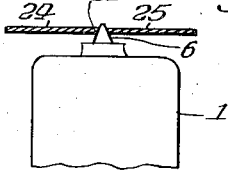
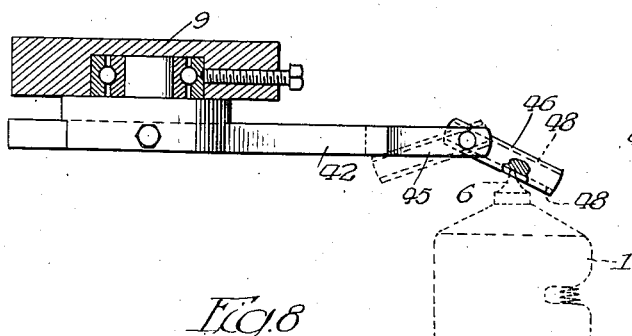
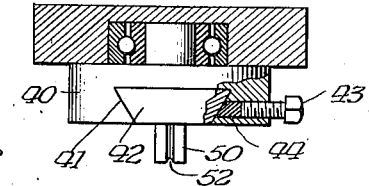
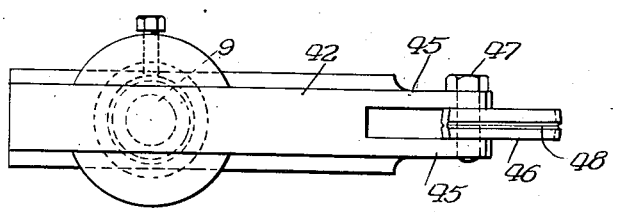
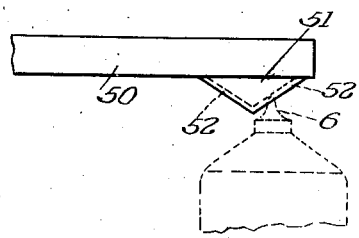
Inventor
Albert L. Woody
By Kent W. Wonnell
Atty.

Patented Oct. 3, 1944

2,359,704

UNITED STATES PATENT OFFICE 2,359,704

FORMING GUIDE FOR ENGRAVING MACHINES

Albert L. Woody, Homewood, Ill.

Application August 20, 1941, Serial No. 407,679

10 Claims. (Cl. 90—62)

This invention relates in general to engraving and similar machines and is more particularly described as a forming guide adapted for floating cutter spindle machines of this type.

An important object of the invention is in the provision of a forming guide capable of continuous adjustment and comparatively quick and easy setting.

A further object of the invention is in the provision of means for guiding a cutter to all points on various concave or convex surfaces differing in curvature, radius, and area.

A further object of the invention is in the provision of an adjustable means for guiding a cutter to all points on various spherical, conical, curved, or other molded surfaces of symmetrical circular form differing either in angular inclination, curvature, radius, form or area, or a combination of several of these.

A still further object of the invention is to provide means for guiding a cutter to all points on various curved or other molded surfaces which form symmetrical circular areas of various radii about a central axis.

Other objects of the invention will appear in the specification and will be apparent from the accompanying drawings, in which;

Fig. 5 illustrates a guide in the form of a bar having a V-groove and conforming approximately to one-half the diameter of an article to be engraved;

Fig. 6 is a bottom view of the guide shown in Fig. 5;

Figs. 7, 8, and 9 are side, bottom, and end views respectively of an adjustable forming guide conforming to a section of an article to be engraved;

Fig. 10 is a modification in which a fixed contour may be used at any required radius;

Fig. 11 illustrates a guide plate having a slot with V-edges therein; and

Fig. 12 shows a conical spindle point engaging a slot in a plate as shown at Fig. 11 or a slot made by two plates moved close together.

To prepare a separate forming guide block for each new and different job of curved surface work is sometimes an expensive operation which consumes considerable time even for skilled operators. The present invention provides means for setting up a spherical or a curved guide, either concave or convex, for varying the curvature of this guide, for centering or adjusting the guide relative to the holder, thereby making it comparatively easy to duplicate any reverse position, various curved, inclined and circular surfaces, to avoid the necessity of preparing a separate guide for each variation of curved or inclined work, and also permitting the use of a guide either in the form of a plate having a groove adapting it to confine the floating cutter spindle to a curve, or other path or track, in its holder.

Figure 1:
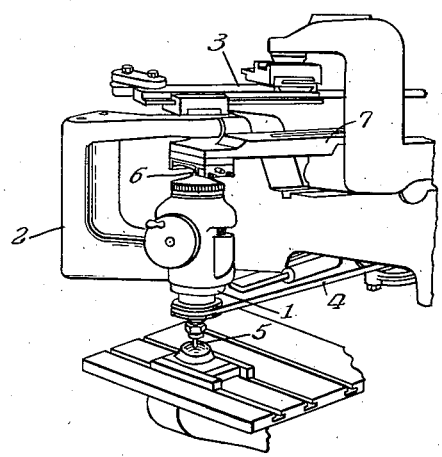
Fig. 1 is a perspective of a portion of an engraving machine to which an embodiment of my invention is applied.
Figure 2:
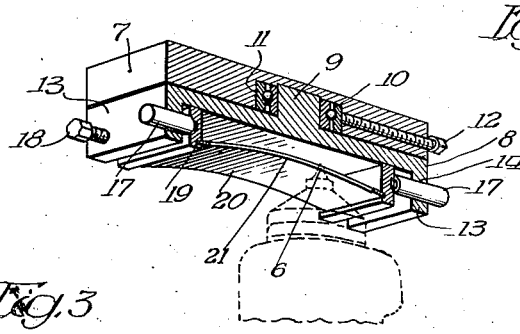
Fig. 2 is a perspective.
Figure 3:
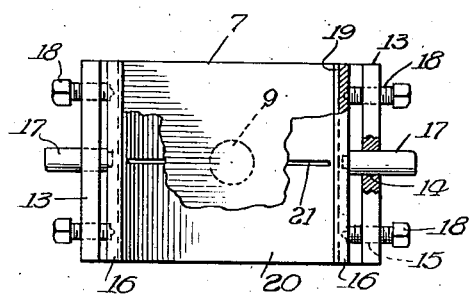
Fig. 3 is a bottom view with parts broken away.
Figure 4:
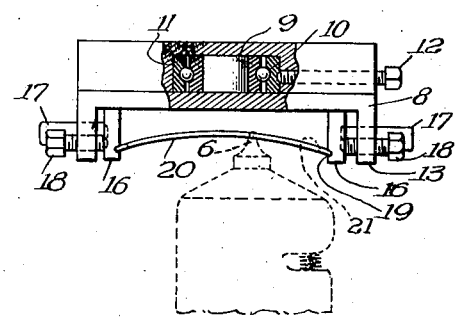
Fig. 4 is a side elevation illustrating my forming guide sheet and means for adjusting and centering it in the holder.

Referring now more particularly to the drawings, Fig. 1 shows a tool holder 1 rotatably mounted in a tool support 2 actuated by the usual pantograph linkage 3. The tool holder is rotated by a driving belt 4 and has an engraving tool 5 at the lower end and a follower spindle 6 at the upper end.

A normally fixed supporting arm 7 adjustably or otherwise supported from the machine frame, overlies the tracer spindle 6 and provides a support for a guide frame 8. The frame is mounted by a spindle 9 pressed into a bearing 10 which fits into a recess 11 at the under side of the arm 7 and may be locked therein against removal by a fastening bolt 12. The frame has sufficient clearance with the under side of the arm so that it is free to rotate in either direction.

At opposite sides of the frame 8 are flanges 13 having guide and threaded openings 14 and 15 respectively. A follower plate 16 at each side of the frame has a guide pin 17 extending through the guide opening 14 and extending through the threaded openings from the outside engaging the plate are adjusting nuts 18. At the inner side of each follower plate is a groove 19 for seating a flexible guide plate 20 therein, the plate being formed of resilient flexible sheet material adapted to be flexed to different curvatures either convex or concave, depending upon the adjustment of the plate 16. The curvature of the plate 20 may also be centered with or made eccentric to the pivot 9 by moving the adjusting screws 18 at the sides thereof.

In the plate 20 is a groove 21 forming a path or track for the upper spindle follower 6. This groove may be rounded or V-shaped in cross section, it may be cut into the surface of the plate, or consist of a slot 22 with V-shaped sides cut through a plate 23 as shown in Fig. 11. The groove may also be formed by two adjacent plate sections 24 and 25 with inclined edges to receive a conical (or other) tracer point 6.

With this construction, a plate of the proper size and thickness to produce the desired curvature is placed in the grooves of the followers 16 and flexed to the desired curvature by tightening the bolts 18. The plate is centered or adjusted with respect to the pivot as desired. With the guide in proper operating condition, the tool holder spindle is brought beneath the guide plate, the upper spindle point 6 is placed in the guide groove 21 and is made freely floating vertically with respect to the supporting arm 2 by means of the internal spring mechanism which tends to press the tracer point upwardly and the rotary cutter 5 downwardly against the surface upon which work is to be performed, the tracer point being confined to the groove 21 which limits its movement to the plane determined by the groove. Motion of the spindle point in the groove determines the curvature of the spherical surface, while simultaneous rotation of the groove in the holder under impetus of the manually controlled spindle determines the area of coverage of the entire spherical surface.

In the form shown by Figs. 5 and 6, a holder 30 is freely pivoted on the supporting arm and comprises a slot for receiving a contour bar 32 either straight or having a special contour 33 at its lower side in which is a V-groove 34 or another suitable path or track adapted to be engaged by a spindle follower point 6.

The bar 32 may be secured by a pivoted or tightening bolt 35 which traverses the slot and extends through a hole 36 in the bar. The bar may be additionally secured in the slot by set screws 37 in threaded holes 38 extending from the slot to the outer edges of the holder. One end 39 of the slot may be sloped upwardly to permit the bar to assume an angle above the horizontal.

With this construction, the contour bar is secured in the slot of the holder at any desired angle and locked in position by the tightening bolt 35 and the set screws 37, the cutter spindle is caused to follow the groove 34 which determines the contour of the plane, and simultaneous circular motion of the bar about the pivot 9 determines the area of the surface coverage. In the forms shown by Figs. 7 to 10, a pivoted holder 40 has a transverse undercut or dovetailed slot 41 in which a bar 42 is slidable and held in any adjusted position therein by a bolt 43 tightened against a plug of brass 44 or other similar material to prevent damaging the bar. At one end of the bar 42 is a slot forming extremities 45 in which a forming bar 46 of suitable contour is adjustably pivoted by means of a bolt 47. The forming bar is provided with contour grooves 48 in its opposite sides so that it may be rotated to one angular position or the other as indicated in Fig. 7 for using either grove and locked in any position as desired.

A similar but reversed fixed angular contour is represented in Fig. 10 in which the bar 50 has a projection 51 near the end with contour grooves 52 in its opposite side faces, traversed by the follower spindle to produce the desired shape. This may be used at any required radius by probably adjusting the bar 50 in a holder 40. In all of these forms, the movement of the tracer point of the floating cutter spindle in the groove determines the contour of a plane, and circular movement of the contour bar about its pivot by means of the manually controlled spindle determines an area generally annular in shape. By this method, a forming guide for a convex or concave profile strip of various curvatures and angles may be easily and quickly prepared with means for setting and maintaining the angle or curvature and for rotating a profile strip of this conformation about its vertical axis of symmetry.

I claim:

1. A forming guide for floating cutter spindle machines comprising an adjustable profile member having a guide groove confined to a plane including the axis of the spindle, and means to mount the member for free rotation with the groove extending through its axis of symmetry.

2. A forming guide for floating cutter spindle machines comprising an adjustable profile member having a guide groove confined to a plane including the spindle axis, a holder to mount the member for free rotation about a central axis, and means for adjusting and centering the member in the holder with the groove intersecting said central axis.

3. A forming guide for floating cutter spindle machines comprising an adjustable profile member having a guide groove confined to a plane which includes the axis of the spindle, and means for holding, adjusting, and centering the member and the guide groove with respect to the axis of symmetry of said member.

4. A forming guide for floating cutter spindle machines comprising an adjustable profile member having a groove confined to a plane which includes the axis of the spindle, a holder in which the member is mounted, and means for adjusting and centering the member in the holder with the groove intersecting the central axis of the holder.

5. A forming guide for floating cutter spindle machines comprising an adjustable profile member in the form of a thin flexible sheet having a guide groove therein confined to a plane which includes the axis of the spindle, an adjustable clamp comprising separate side members for engaging opposite edges of the sheet and applying pressure thereto to flex the sheet convexly or concavely and the member being separately adjustable for centering the sheet in the clamp.

6. In a forming guide for floating cutter spindle machines, a pivoted holder for a flexible profile member, said holder having opposite projecting sides, guide plates adjacent each of the sides with grooves therein to engage the member, and adjusting means in connection with each of the sides and engaging the plates for adjusting the curvature and centering the member in the holder.

7. In a forming guide for a floating cutter spindle machine, a pivoted holder having opposite side members with grooves therein for engaging thin resilient guiding sheets, means for flexing sheets therein to various curvatures either convex or concave, and means forming a guide groove in the sheets in the holder intersecting the axis of the holder and confining the movement of a spindle follower to a plane transverse of the holder.

8. In a forming guide of the class described, a rotatable holder with opposite projecting sides having guide and threaded holes therethrough, a guide plate for each side having a groove at one side for engaging a flexible sheet and a projection at the other side for engaging the guide hole, and adjusting screws extending through the threaded openings for engaging the sides of the guide plates opposite the grooves therein for flexing, adjusting and centering a flexible sheet therein with respect to the axis of rotation of the holder.

9. A forming guide for floating cutter spindle machines comprising a profile member having a groove confined to a plane which includes the spindle axis and conforming to a section of the article to be engraved, means for adjusting and holding the profile member in a desired position, and a pivotal support for said member to permit free rotation of said plane around a central axis, the groove intersecting the axis of the pivotal support.

10. A forming guide for floating cutter spindle engraving machines comprising a profile member confined to a plane which includes the axis of the spindle and conforming approximately to one-half of the cross section of an article to be engraved, a pivotal support for the profile element to permit free rotation of said plane to any angle about its axis of symmetry, and means for setting and maintaining the angular position of the member.

ALBERT L. WOODY.